(12) United States Patent
Ishihara

(10) Patent No.: US 12,266,773 B2
(45) Date of Patent: Apr. 1, 2025

(54) PARTITION MEMBER AND BATTERY ASSEMBLY

(71) Applicant: MITSUBISHI CHEMICAL CORPORATION, Tokyo (JP)

(72) Inventor: Kei Ishihara, Hikone (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 725 days.

(21) Appl. No.: 17/487,051

(22) Filed: Sep. 28, 2021

(65) Prior Publication Data

US 2022/0013826 A1    Jan. 13, 2022

Related U.S. Application Data

(63) Continuation of application No. PCT/JP2020/013897, filed on Mar. 27, 2020.

(30) Foreign Application Priority Data

Mar. 28, 2019  (JP) .................................. 2019-062041
Mar. 28, 2019  (JP) .................................. 2019-062042

(51) Int. Cl.
*H01M 10/613* (2014.01)
*H01M 10/625* (2014.01)
*H01M 10/651* (2014.01)
*H01M 10/658* (2014.01)
*H01M 50/231* (2021.01)
*H01M 50/293* (2021.01)

(52) U.S. Cl.
CPC ....... *H01M 10/613* (2015.04); *H01M 10/625* (2015.04); *H01M 10/651* (2015.04); *H01M 10/658* (2015.04); *H01M 50/231* (2021.01); *H01M 50/293* (2021.01); *H01M 2220/20* (2013.01)

(58) Field of Classification Search
CPC ..... H01M 10/613–659; H01M 10/6552–6567; H01M 50/209–231; H01M 50/291–293; H01M 2220/20; H01M 10/625; H01M 10/651; H01M 10/658
See application file for complete search history.

(56) References Cited

U.S. PATENT DOCUMENTS

2019/0165436 A1    5/2019   Kuboki et al.

FOREIGN PATENT DOCUMENTS

| JP | 2013131428 A | 7/2013 |
| JP | 5352681 B2 | 11/2013 |
| JP | 2019102244 A | 6/2019 |

(Continued)

OTHER PUBLICATIONS

International Search Report issued Jun. 23, 2020 in PCT/JP2020/013897 (with English translation), 5 pages.

(Continued)

*Primary Examiner* — Haroon S. Sheikh
*Assistant Examiner* — Kan Luo
(74) *Attorney, Agent, or Firm* — Element IP, PLC

(57) ABSTRACT

A partition member having a thermal insulating material capable of retaining a liquid, and an external package housing the thermal insulating material and the liquid, having a particular set relationship among the internal space area of the external package, the size of the thermal insulating material, the thickness of the thermal insulating material, and the volume of the liquid.

20 Claims, 3 Drawing Sheets

(56) References Cited

FOREIGN PATENT DOCUMENTS

| | | |
|---|---|---|
| WO | WO-2012032697 A1 | 3/2012 |
| WO | WO-2017051648 A1 | 3/2017 |
| WO | WO-2018124231 A1 | 7/2018 |
| WO | WO-2018169044 A1 | 9/2018 |
| WO | WO-2019107562 A1 | 6/2019 |

OTHER PUBLICATIONS

Office Action issued Feb. 22, 2024, in corresponding Indian Patent Application No. 202117043847, 5 pages.

PARTITION MEMBER AND BATTERY ASSEMBLY

TECHNICAL FIELD

The present invention relates to a partition member and a battery assembly.

BACKGROUND ART

As for a secondary battery, the use of which as an electric power source for vehicles and the like is rapidly increased, the increase of the energy density of the secondary battery is being investigated in recent years for the purpose of enhancing the degree of freedom in mounting in the limited space of vehicles and the like, the purpose of enhancing the cruising range per single charge, and the like. There is a tendency that the safety of a secondary battery conflicts with the energy density thereof, and a secondary battery having a higher energy density tends to have lower safety. For example, in the case where a secondary battery mounted on an electric automobile having a cruising range reaching several hundred kilometers is broken due to overcharge, internal short circuit, or the like, the battery surface temperature exceeds several hundred degrees centigrade and may be close to 1,000° C. in some cases.

Secondary batteries used as an electric power source of vehicles and the like are generally used in the form of a battery assembly including plural single cells, and therefore in the case where one of the single cells constituting the battery assembly is damaged and reaches the aforementioned temperature range, the adjacent single cells are also damaged due to the heat generation, resulting in a concern of the chain spread of damages over the battery assembly. For preventing the chain spread of damages over the single cells, various techniques have been proposed for providing a partition member between the single cells and cooling the damaged single cell.

For example, there has been a module including a partition member having a structure including a bag in a sheet form having therein a coolant, such as water, disposed between single cells (see, for example, PTL 1). According to the module, heat generated in the adjacent single cell can be efficiently transferred to the nearby single cells, and in addition, in the case where the adjacent single cell is damaged, and the surface of the cell reaches a high temperature, water in the bag is discharged from the opening part, and the damaged cell can be cooled. There has also been a partition member having a structure including a bag in a sheet form having therein a porous material impregnated with a coolant, such as water (see, for example, PTL 2).

CITATION LIST

Patent Literatures

PTL 1: Japanese Patent No. 5,352,681
PTL 2: JP 2013-131428 A

SUMMARY OF INVENTION

Technical Problem

As a result of the detailed investigations for these ordinary techniques by the present inventors, the following problems have been found. Specifically, single cells in a battery assembly receive a confining pressure in the production of the battery assembly. Furthermore, the electrodes inside the single cells are expanded in charging, and therefore the chassis of the single cells are also expanded to press the adjacent members. Moreover, the single cell is expanded due to the generation of gas from the electrolytic solution inside the single cell in the repeated use of the single cell, so as to generate pressure. The partition member disposed between single cells is demanded to have pressure resistance due to these factors. However, the partition members described in PTLs 1 and 2 are not sufficiently investigated for the pressure resistance.

The present inventors have structured a partition member including a thermal insulating material retaining a liquid, and an external package for housing them. The partition member has such characteristics that the thermal resistance is switched before and after the temperature at which the vapor pressure of the liquid exceeds the breakdown strength of the external package (i.e., the opening temperature). At less than the opening temperature, a low thermal resistance is exhibited by the liquid retained inside the external package, whereas at the opening temperature or more, the liquid is evaporated, and a high thermal resistance is exhibited by the remaining thermal insulating material. According to the characteristics, the partition member in contact with the single cell causing abnormal temperature increase due to overcharge, internal short circuit, or the like is opened and can suppress thermal conduction to the adjacent single cell due to the high thermal resistance thereof. On the other hand, the partition member between single cells other than the single cell causing the abnormal phenomenon has a low thermal resistance, and the temperature increase of the cells due to the thermal conduction from the single cell causing the abnormal phenomenon can be suppressed.

However, for achieving the characteristics, it has been found that depending on the structures of the thermal insulating material, the liquid, and the external package, there are cases where the opening temperature cannot be sufficiently high, and the thermal resistance after opening cannot be sufficiently high, and there are also cases where the switch of the thermal resistance before and after opening does not occur properly. In view of these problems, an object of the present invention is to provide a partition member that has a sufficiently high opening temperature and a sufficiently high thermal resistance after opening, and can properly switch the thermal resistance before and after opening, and a battery assembly.

Solution to Problem

As a result of the earnest investigations by the present inventors for solving the problems, it has been found that the problems can be solved by a partition member including a thermal insulating material capable of retaining a liquid, and an external package housing the thermal insulating material and the liquid, having a properly set relationship among the internal space area of the external package, the size of the thermal insulating material, the thickness of the thermal insulating material, and the volume of the liquid, and thus the present invention has been completed. The substance of the present invention is as follows.

[1] A partition member having a thickness direction and a plane direction perpendicular to the thickness direction, partitioning single cells, or a single cell and a member other than a single cell, in the thickness direction, including a liquid and a thermal insulating material capable of retaining the liquid, and an external package housing the thermal insulating material and the liquid, having an area (S1) of an internal space of the external package and an area (S2) of the thermal insulating material in plane view of the external package and the thermal insulating material in the thickness direction, a thickness (expression 2: D1) of the thermal insulating material, and a volume (expression 2: V1) of the liquid that satisfy the relationship of the following expression 1 and/or the following expression 2:

$$0.25 \leq V1/(S1 \times D1) \leq 0.70 \quad \text{expression 1:}$$

$$0.35 \leq S2/S1 \quad \text{expression 2:}$$

[2] The partition member according to the item [1], wherein S1 satisfies the relationship of the following expression 3:

$$10 \text{ cm}^2 \leq S1 \leq 2{,}000 \text{ cm}^2 \quad \text{expression 3:}$$

[3] The partition member according to the item [1] or [2], wherein S2 satisfies the relationship of the following expression 4:

$$10 \text{ cm}^2 \leq S2 \leq 2{,}000 \text{ cm}^2 \quad \text{expression 4:}$$

[4] The partition member according to any one of the items [1] to [3], wherein V1 satisfies the relationship of the following expression 5:

$$0.02 \text{ cm}^3 \leq V1 \leq 1{,}000 \text{ cm}^3 \quad \text{expression 5:}$$

[5] The partition member according to any one of the items [1] to [4], wherein D1 satisfies the relationship of the following expression 6:

$$0.10 \text{ mm} \leq D1 \leq 5.0 \text{ mm} \quad \text{expression 6:}$$

[6] The partition member according to any one of the items [1] to [5], wherein the external package has an internal pressure that is lower than an external pressure.

[7] The partition member according to any one of the items [1] to [6], wherein the external package is a laminate of a metal foil and a resin.

[8] The partition member according to the item [7], wherein the metal foil is at least one selected from an aluminum foil, a copper foil, a nickel foil, a stainless steel foil, a lead foil, a tin foil, a bronze foil, a silver foil, an iridium foil, and a phosphor bronze foil.

[9] The partition member according to the item [7] or [8], wherein the resin is a thermoplastic resin.

[10] The partition member according to any one of the items [1] to [9], wherein the partition member includes a liquid having a boiling point under ordinary pressure of 80 to 250° C. as the liquid.

[11] The partition member according to any one of the items [1] to [10], wherein the partition member includes water as the liquid.

[12] A battery assembly including a partition member having a thickness direction and a plane direction perpendicular to the thickness direction, partitioning single cells, or a single cell and a member other than a single cell, in the thickness direction, and plural single cells, the partition member including a liquid and a thermal insulating material capable of retaining the liquid, and an external package housing the thermal insulating material and the liquid, having an area (S1) of an internal space of the external package and an area (S2) of the thermal insulating material in plane view of the external package and the thermal insulating material in the thickness direction, a thickness (D2) of the thermal insulating material, and a volume (V1) of the liquid that satisfy the relationship of the following expression 7 and/or the following expression 2:

$$0.40 \leq V1/(S1 \times D2) \leq 1.00 \quad \text{expression 7:}$$

$$0.35 \leq S2/S1 \quad \text{expression 2:}$$

[13] The battery assembly according to the item [12], wherein S1 satisfies the relationship of the following expression 3:

$$10 \text{ cm}^2 \leq S1 \leq 2{,}000 \text{ cm}^2 \quad \text{expression 3:}$$

[14] The battery assembly according to the item [12] or [13], wherein S2 satisfies the relationship of the following expression 4:

$$10 \text{ cm}^2 \leq S2 \leq 2{,}000 \text{ cm}^2 \quad \text{expression 4:}$$

[15] The battery assembly according to any one of the items [12] to [14], wherein V1 satisfies the relationship of the following expression 5:

$$0.02 \text{ cm}^3 \leq V1 \leq 1{,}000 \text{ cm}^3 \quad \text{expression 5:}$$

[16] The battery assembly according to any one of the items [12] to [15], wherein D2 satisfies the relationship of the following expression 8:

$$0.10 \text{ mm} \leq D2 \leq 5.0 \text{ mm} \quad \text{expression 8:}$$

[17] The battery assembly according to any one of the items [12] to [16], wherein D2 satisfies the relationship of the following expression 9:

$$0.10 \text{ mm} \leq D2 \leq 1.0 \text{ mm} \quad \text{expression 9:}$$

[18] The battery assembly according to any one of the items [12] to [17], wherein the external package has an internal pressure that is lower than an external pressure.

[19] The battery assembly according to any one of the items [12] to [18], wherein the external package is a laminate of a metal foil and a resin.

[20] The battery assembly according to the item [19], wherein the metal foil is at least one selected from an aluminum foil, a copper foil, a nickel foil, a stainless steel foil, a lead foil, a tin foil, a bronze foil, a silver foil, an iridium foil, and a phosphor bronze foil.

[21] The battery assembly according to the item [19] or [20], wherein the resin is a thermoplastic resin.

[22] The battery assembly according to any one of the items [12] to [21], wherein the battery assembly includes a liquid having a boiling point under ordinary pressure of 80 to 250° C. as the liquid.

[23] The battery assembly according to any one of the items [12] to [22], wherein the battery assembly includes water as the liquid.

[24] A partition member having a thickness direction and a plane direction perpendicular to the thickness direction, partitioning single cells, or a single cell and a member other than a single cell, in the thickness direction, including a liquid and a thermal insulating material capable of retaining the liquid, and an external package housing the thermal insulating material and the liquid, in structuring a battery assembly including the partition member and plural single cells, having an area (S1) of an internal space of the external package and an area (S2) of the thermal insulating material in plane view of the external package and the thermal insulating material in the thickness direction, a thickness (D2) of the thermal insulating material, and a volume (V1) of the liquid that satisfy the relationship of the following expression 7 and/or the following expression 2:

$$0.40 \leq V1/(S1 \times D2) \leq 1.00 \quad \text{expression 7:}$$

$$0.35 \leq S2/S1 \quad \text{expression 2:}$$

[25] The partition member according to the item [24], wherein S1 satisfies the relationship of the following expression 3:

$$10 \text{ cm}^2 \leq S1 \leq 2{,}000 \text{ cm}^2 \quad \text{expression 3:}$$

[26] The partition member according to the item [24] or [25], wherein S2 satisfies the relationship of the following expression 4:

$$10 \text{ cm}^2 \leq S2 \leq 2{,}000 \text{ cm}^2 \quad \text{expression 4:}$$

[27] The partition member according to any one of the items [24] to [26], wherein V1 satisfies the relationship of the following expression 5:

$$0.02 \text{ cm}^3 \leq V1 \leq 1{,}000 \text{ cm}^3 \quad \text{expression 5:}$$

[28] The partition member according to any one of the items [24] to [27], wherein D2 satisfies the relationship of the following expression 8:

$$0.10 \text{ mm} \leq D2 \leq 5.0 \text{ mm} \quad \text{expression 8:}$$

[29] The partition member according to any one of the items [24] to [28], wherein the external package has an internal pressure that is lower than an external pressure.

[30] The partition member according to any one of the items [24] to [29], wherein the external package is a laminate of a metal foil and a resin.

[31] The partition member according to the item [30], wherein the metal foil is at least one selected from an aluminum foil, a copper foil, a nickel foil, a stainless steel foil, a lead foil, a tin foil, a bronze foil, a silver foil, an iridium foil, and a phosphor bronze foil.

[32] The partition member according to the item [30] or [31], wherein the resin is a thermoplastic resin.

[33] The partition member according to any one of the items [24] to [32], wherein the partition member includes a liquid having a boiling point under ordinary pressure of 80 to 250° C. as the liquid.

[34] The partition member according to any one of the items [24] to [33], wherein the partition member includes water as the liquid.

[35] The partition member according to any one of the items [24] to [34], wherein D2 satisfies the relationship of the following expression 9:

$$0.10 \text{ mm} \leq D2 \leq 1.0 \text{ mm} \quad \text{expression 9:}$$

[36] The battery assembly according to any one of the items [12] to [23], wherein in producing a battery assembly including a partition member partitioning single cells, or a single cell and a member other than a single cell, in the thickness direction, and plural single cells, a confining pressure is 0.1 to 10 MPa.

Advantageous Effects of Invention

According to the present invention, a partition member that has a sufficiently high opening temperature and a sufficiently high thermal resistance after opening, and can properly switch the thermal resistance before and after opening, and a battery assembly can be provided.

DESCRIPTION OF EMBODIMENTS

Figure 1A:
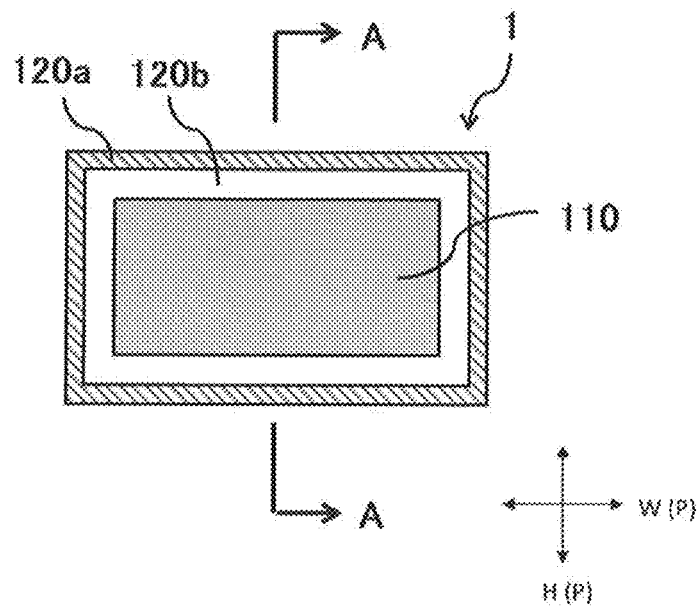
FIG. 1A is a front view showing a first structure example of the partition member according to the present invention.

The present invention will be described in detail below. The descriptions shown below are examples (representative examples) of embodiments of the present invention, and the present invention is not limited to the descriptions unless deviating from the substance of the present invention.

The partition member of the present invention has a thickness direction and a plane direction perpendicular to the thickness direction, partitions single cells, or a single cell and a member other than a single cell, in the thickness direction, includes a liquid and a thermal insulating material capable of retaining the liquid, and an external package housing the thermal insulating material and the liquid, and has an area (S1) of an internal space of the external package and an area (S2) of the thermal insulating material in plane view of the external package and the thermal insulating material in the thickness direction, a thickness (D1) of the thermal insulating material, and a volume (V1) of the liquid that satisfy the relationship of the following expression 1 and/or the following expression 2.

$$0.25 \leq V1/(S1 \times D1) \leq 0.70 \quad \text{expression 1:}$$

$$0.35 \leq S2/S1 \quad \text{expression 2:}$$

The member other than the single cell in the battery assembly may be, for example, a chassis having a bottom panel and four side panels, housing the single cells and the partition members constituting the battery assembly. The area of the internal space of the external package means an area of a space sealed with the external package, and shows an area range within which the liquid retained by the thermal insulating material can move.

The expression 1 shows the proper range of the ratio of the liquid volume and the internal space volume calculated as the product of the internal space area and the thermal insulating material thickness. The liquid retained by the thermal insulating material can move within the internal space volume, and therefore the ratio of the liquid volume and the internal space volume determines the extent of the influence of the thermal conduction of the liquid occupied in the thermal conduction of the partition member before opening. In the case where the ratio is small, the influence of the thermal conduction of the liquid is small, and the thermal resistance before opening is large. As a result, the thermal resistance cannot be properly switched before and after opening. The liquid retained by the thermal insulating material is gradually evaporated associated with the increase of the temperature of the partition member. The ratio of the liquid volume and the internal space volume determines the space capable of retaining the evaporated gas. In the case where the ratio is large, the space capable of retaining the gas becomes small, and the internal pressure of the internal space volume exceeds the breakdown strength before the temperature is not sufficiently increased.

With the satisfaction of the expression 1, the partition member of the present invention has a large difference in thermal resistance before and after opening and shows a high opening temperature, and the value of $V1/(S1 \times D1)$ is preferably 0.28 or more, and more preferably 0.30 or more, from the standpoint of the achievement of the lower thermal resistance before opening, and is preferably 0.65 or less, and more preferably 0.63 or less, from the standpoint of the achievement of the more stable high opening temperature.

In the partition member of the present invention, the thermal insulating material is deformed corresponding to an external force on the partition member. The external force on the partition member may be, for example, the confining force in the production process of the battery assembly, the force received from the single cells due to the expansion associated with charging of the single cells partitioned with the partition member, the force received from the single cells due to the expansion of the cells caused by the gas generation from the electrolytic solution inside the cells in the repeated use of the cells, and the like. For example, the thermal insulating material is contracted in the thickness direction by the expansion of the facing single cells or the confining force. In the compression deformation of the thermal insulating material, the thermal resistance is decreased corresponding to the deformation amount thereof. The expression 2 shows the proper range of the ratio of the thermal insulating material area and the internal space area. A large value of the ratio means a small pressure received by the thermal insulating material due to the external force on the partition member, and as a result, means a small compression deformation amount of the thermal insulating material.

With the satisfaction of the expression 2, the partition member of the present invention has a sufficiently high thermal resistance after opening, and the value of $S2/S1$ is preferably 0.40 or more, and more preferably 0.45 or more. The upper limit thereof is not particularly limited, and is generally 0.85 or less.

The satisfaction of the relationship of the expression 2 by $S2/S1$ means a sufficiently small pressure received by the thermal insulating material due to the load on the partition member, and as a result, means a small compression deformation amount of the thermal insulating material. From this standpoint, the value of $S2/S1$ is more preferably 0.40 or more.

In the partition member of the present invention, S1 preferably satisfies the relationship of the following expression 3. The value of S1 preferably satisfies the lower limit value of the expression 3, more preferably 20 cm$^2$ or more, further preferably 40 cm$^2$ or more, particularly preferably 50 cm$^2$ or more, and still further preferably 60 cm$^2$ or more, from the standpoint of the achievement of the low thermal resistance before opening. The value preferably satisfies the upper limit value of the expression 3, more preferably 1,500 cm$^2$ or less, further preferably 1,000 cm$^2$ or less, particularly preferably 400 cm$^2$ or less, still further preferably 350 cm$^2$ or less, and particularly further preferably 300 cm$^2$ or less, from the standpoint of the achievement of the high thermal resistance after opening.

$$10 \text{ cm}^2 \leq S1 \leq 2{,}000 \text{ cm}^2 \qquad \text{expression 3:}$$

In the partition member of the present invention, the area (S2) of the thermal insulating material in plane view of the thermal insulating material in the thickness direction preferably satisfies the relationship of the following expression 4. The value of S2 preferably satisfies the lower limit value of the expression 4, more preferably 20 cm$^2$ or more, further preferably 40 cm$^2$ or more, particularly preferably 50 cm$^2$ or more, and still further preferably 60 cm$^2$ or more, from the standpoint of the achievement of the low thermal resistance before opening. The value preferably satisfies the upper limit value of the expression 4, more preferably 1,500 cm$^2$ or less, further preferably 1,000 cm$^2$ or less, still further preferably 400 cm$^2$ or less, particularly preferably 350 cm$^2$ or less, and particularly further preferably 300 cm$^2$ or less, from the standpoint of the achievement of the high thermal resistance after opening.

$$10 \text{ cm}^2 \leq S2 \leq 2{,}000 \text{ cm}^2 \qquad \text{expression 4:}$$

In the partition member of the present invention, V1 preferably satisfies the following expression 5. The value of V1 preferably satisfies the lower limit value of the expression 5, more preferably 0.05 cm$^3$ or more, further preferably 0.1 cm$^3$ or more, particularly preferably 0.5 cm$^3$ or more, and still further preferably 1.0 cm$^3$ or more, from the standpoint of the achievement of the low thermal resistance before opening. The value preferably satisfies the upper limit value of the expression 5, more preferably 700 cm$^3$ or less, further preferably 500 cm$^3$ or less, particularly preferably 150 cm$^3$ or less, and still further preferably 100 cm$^3$ or less, from the standpoint of the achievement of the sufficiently high opening temperature.

$$0.02 \text{ cm}^3 \leq V1 \leq 1{,}000 \text{ cm}^3 \qquad \text{expression 5:}$$

In the partition member of the present invention, D1 preferably satisfies the following expression 6. The value of D1 preferably satisfies the lower limit value of the expression 6, more preferably 0.40 mm or more, and further preferably 0.70 mm or more, from the standpoint of the suppression of thermal conduction from the single cell causing abnormal temperature increase to the adjacent single cell, and preferably satisfies the upper limit value of the expression 6, more preferably 4.0 mm or less, and further preferably 3.0 mm or less, from the standpoint of the decrease of the overall thickness of the battery assembly.

$$0.10 \text{ mm} \leq D1 \leq 5.0 \text{ mm} \qquad \text{expression 6:}$$

<Partition Member>

Figure 1B:
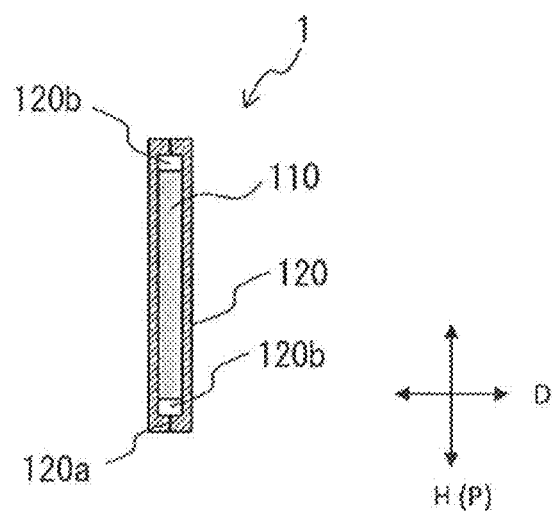
FIG. 1B is an illustration showing an end surface of the partition member shown in FIG. 1A cut at line A-A.

FIG. 1A is a front view showing a structure example of the partition member according to the present invention. FIG. 1B is an illustration showing an end surface of the partition member shown in FIG. 1A cut at line A-A. The outer shape of the partition member 1 may be formed, for example, into a flat plate form or a sheet form having a thickness.

In the example shown in FIGS. 1A and 1B, the partition member 1 is formed into a flat plate form having a height, a width, and a thickness, and has a thickness direction D and a plane direction P. The plane direction P is the direction perpendicular to the thickness direction D. The plane direction P includes the height direction H, the width direction W, and the diagonal directions of the partition member 1, as far as the directions are perpendicular to the thickness direction D.

The partition member 1 is used for partitioning the single cells constituting the battery assembly, or the single cell and the member other than the single cell constituting the battery assembly, in the thickness direction D.

[Thermal Insulating Material]

The thermal insulating material 110 is capable of retaining a liquid, and generally has elasticity. The thermal insulating material 110 having elasticity is contracted or deformed in the thickness direction D due to the expansion of the single cells. In the example shown in FIG. 1A, the thermal insulating material 110 is formed into a flat plate form or a sheet form. The thermal insulating material 110 is housed in an external package 120 having a flat plate form or a sheet form, and sealed at the peripheral portion of the external package 120.

The thermal insulating material 110 preferably contains a powder inorganic material and a fibrous inorganic material. In the present invention, the "fibrous inorganic material" means an inorganic material having a shape with a long diameter that is 100 times or more the short diameter, and the "powder inorganic material" means an inorganic material having a shape with a long diameter that is less than 100 times the short diameter. In the fibrous shape, particularly, the "long diameter" means the fiber length, and the "short diameter" means the diameter of the cross section perpendicular to the long diameter direction.

The fibrous inorganic material is preferably, for example, at least one selected from the group consisting of paper, a cotton sheet, polyimide fibers, aramid fibers, polytetrafluoroethylene (PTFE) fibers, glass fibers, rock wool, ceramic fibers, and biosoluble inorganic fibers. Among these, at least one selected from glass fibers, rock wool, ceramic fibers, and biosoluble fibers is particularly preferred. The ceramic fibers may be fibers formed mainly of silica and alumina (silica/alumina=40/60 to 0/100), and silica-alumina fibers, mullite fibers, and alumina fibers may be used.

The powder inorganic material is preferably, for example, at least one selected from the group consisting of silica particles, alumina particles, calcium silicate, a clay mineral, vermiculite, mica, cement, pearlite, fumed silica, and aerogel, and among these, at least one selected from silica particles, alumina particles, calcium silicate, and vermiculite is preferred. Among the species of calcium silicate, xonotlite, tobermorite, wollastonite, and gyrolite are preferred, and gyrolite is particularly preferred. Gyrolite having a petaloid structure retains the porous structure even in compression deformation, and thus is excellent in liquid retainability. The clay mineral may be mainly magnesium silicate (including talc and sepiolite), montmorillonite, and kaolinite.

The thermal insulating material containing a powder inorganic material and a fibrous inorganic material may be selected from known materials. For example, the thermal insulating material used may be selected from the materials described in JP 2003-202099 A.

The density of the thermal insulating material is preferably 0.20 to 1.10 g/cm$^3$ from the standpoint of the achievement of the light weight and the excellent thermal insulating capability at high temperature. The density of the thermal insulating material that is the lower limit value or more is preferred from the standpoint of the thermal insulating capability and the liquid retainability since an air layer is largely contained in the internal voids, and the density that is the upper limit value or less is preferred from the standpoint of the achievement of the small deformation amount in compression. The density of the thermal insulating material is preferably 0.35 g/cm$^3$ or more, and more preferably 0.55 g/cm$^3$ or more, and is preferably 1.05 g/cm$^3$ or less, and more preferably 1.00 g/cm$^3$ or less, from the standpoint above.

[Liquid]

In the partition member 1, it suffices that the liquid retained by the thermal insulating material 110 housed in the internal space of the external package is a liquid that has a thermal conductivity and can efficiently transfer heat generated from the single cell to the nearby single cells. The liquid is preferably a liquid having a boiling point under ordinary pressure (1 atm) of 80° C. or more and 250° C. or less, and is more preferably a liquid having a boiling point under ordinary pressure of 100° C. or more and 150° C. or less. The liquid is particularly preferably water since water has a large vaporization heat and is available for general use.

The liquid preferably contains, for example, at least one selected from the group consisting of water, an alcohol compound, an ester compound, an ether compound, a ketone compound, a hydrocarbon compound, a fluorine based compound, and a silicone based oil. These compounds may be used alone or as a mixture of two or more kinds thereof.

Examples of the alcohol compound that can be used in the liquid include an alcohol having 3 to 8 carbon atoms, such as propanol, isopropanol, butanol, benzyl alcohol, and phenylethyl alcohol, and a dihydric or higher alcohol, such as an alkylene glycol, e.g., ethylene glycol and propylene glycol. These compounds may be used alone or as a mixture of two or more kinds thereof.

Examples of the ester compound that can be used in the liquid include an alkyl aliphatic carboxylate, a dialkyl carbonate, a dialkyl oxalate, and an ethylene glycol fatty acid ester. Examples of the alkyl aliphatic carboxylate include a lower alkyl aliphatic carboxylate, examples of which include a lower alkyl formate, such as methyl formate, n-butyl formate, and isobutyl formate; a lower alkyl acetate, such as n-propyl acetate, isopropyl acetate, n-butyl acetate, and isobutyl acetate; and a lower alkyl propionate, such as ethyl propionate, n-propyl propionate, isopropyl propionate, n-butyl propionate, and isobutyl propionate. Examples of the dialkyl carbonate include a di(lower alkyl) carbonate, such as dimethyl carbonate, diethyl carbonate, dibutyl carbonate, and methyl ethyl carbonate. Examples of the dialkyl oxalate include a di(lower alkyl) oxalate, such as dimethyl oxalate and diethyl oxalate. Examples of the ethylene glycol fatty acid ester include ethylene glycol acetate. These compounds may be used alone or as a mixture of two or more kinds thereof.

Examples of the ether compound that can be used in the liquid include n-butyl ether, n-propyl ether, and isoamyl ether. These compounds may be used alone or as a mixture of two or more kinds thereof.

Examples of the ketone compound that can be used in the liquid include ethyl methyl ketone and diethyl ketone. These compounds may be used alone or as a mixture of two or more kinds thereof.

Examples of the hydrocarbon compound that can be used in the liquid include heptane, octane, nonane, decane, toluene, and xylene. These compounds may be used alone or as a mixture of two or more kinds thereof.

Examples of the fluorine based compound that can be used in the liquid include a refrigerant, such as 1,1,2,2,3,3,4-heptafluorocyclopentane (HFC-c447ef) and 1,1,1,2,2,3,3,4,4,5,5,6,6-tridecafluorooctane (HFC-76-13sf). These compounds may be used alone or as a mixture of two or more kinds thereof.

Examples of the silicone based oil that can be used in the liquid include a modified silicone oil, such as methylpolysiloxane, methylphenylpolysiloxane, cyclic methylsiloxane, and a silicone polyether copolymer. These compounds may be used alone or as a mixture of two or more kinds thereof.

The liquid may contain an antifreezing agent, an antiseptic agent, and a pH modifier. These materials may be used alone or as a mixture of two or more kinds thereof. The liquid may contain an additive, such as a substance imparting unfreezability (i.e., an antifreezing agent), an antiseptic agent, and a pH modifier. The materials to be contained in the liquid are not limited to these materials, and materials may be added depending on necessity.

[External Package]

The external package 120 has a peripheral portion 120a to be sealed, and houses the thermal insulating material 110 retaining the liquid in the internal space formed through sealing. The external package 120 has flexibility and can be deformed corresponding to expansion of the single cells. In the case where the single cells are contracted, the external package 120 can restore the original state. Examples of the material applied to the external package 120 include a resin sheet and a resin film. For example, the thermal insulating material 110 is held by two sheets of a resin sheet or film or a folded resin sheet or film, and the peripheral portion of the external package 120, at which the two sheets of the resin sheet or film are into contact with each other, is heat-fusion bonded or adhered to seal the thermal insulating material 110 impregnated with the liquid.

Examples of the external package 120 include a material formed of a resin or a metal. A material obtained by laminating a metal foil and a resin is preferred due to the high heat resistance and the high strength thereof. The laminate of a metal and a resin is preferably a laminate having three or more layers including a resin layer, a metal layer, and a resin sealant layer.

Examples of the metal foil include an aluminum foil, a copper foil, a tin foil, a nickel foil, a stainless steel foil, a lead foil, a tin-lead alloy foil, a bronze foil, a silver foil, an iridium foil, and a phosphor bronze foil. In particular, an aluminum foil, a copper foil, and a nickel foil are preferred, and an aluminum foil is more preferred.

The resin used may be at least one of a thermosetting resin and a thermoplastic resin, and a thermoplastic resin is particularly preferred. Examples of the resin include polyethylene, polypropylene, polystyrene, nylon, an acrylic resin, an epoxy resin, polyurethane, polyether ether ketone, polyethylene terephthalate, polyphenyl sulfide, polycarbonate, and aramid. In particular, at least one selected from polypropylene, nylon, and polyethylene terephthalate is preferred.

The thickness of the external package 120 is not particularly limited, and may be, for example, 5 to 200 μm. For the laminate described above, the thickness may be 3 to 50 μm for the metal foil, and may be 2 to 150 μm for the resin layer.

The two external packages 120 are bonded in a ring form through thermal fusion, adhesion, or the like of the peripheral portions thereof, so as to seal the liquid and the thermal insulating material 110 inside the external package 120. In alternative, it is possible that one external package is folded, and the peripheral portion thereof is bonded through thermal fusion, adhesion, or the like, so as to seal the liquid and the thermal insulating material 110. The external package 120 preferably has flexibility (elasticity) and may have no flexibility in some cases.

The internal pressure of the external package 120 is preferably lower than the external pressure from the standpoint of the achievement of the sufficiently high opening temperature. Accordingly, the external package 120 is sealed particularly preferably by vacuum sealing.

<Battery Assembly>

The battery assembly of the present invention includes a partition member having a thickness direction and a plane direction perpendicular to the thickness direction, partitioning single cells, or a single cell and a member other than a single cell, in the thickness direction, and plural single cells, and the partition member includes a liquid and a thermal insulating material capable of retaining the liquid, and an external package housing the thermal insulating material and the liquid, and has an area (S1) of an internal space of the external package and an area (S2) of the thermal insulating material in plane view of the external package and the thermal insulating material in the thickness direction, a thickness (D2) of the thermal insulating material, and a volume (V1) of the liquid that satisfy the relationship of the following expression 7 and/or the following expression 2:

$$0.40 \leq V1/(S1 \times D2) \leq 1.00 \quad \text{expression 7:}$$

$$0.35 \leq S2/S1 \quad \text{expression 2:}$$

In the production of the battery assembly using the partition member, a confining pressure of approximately 0.1 to 10 MPa is generally applied, and thereby the thickness D2 of the thermal insulating material in the battery assembly is smaller than the thickness D1 thereof before the production of the battery assembly. The battery assembly of the present invention satisfies the expression 7, the comparison of which to the expression 1 to be satisfied by the partition member of the present invention reveals that the expression 7 has the term having D2 replacing D1 in the expression 1, and as a result of the fact that D2 is smaller than D1 due to the aforementioned mechanism, the values of the upper and lower limits to be satisfied by $V1/(S1 \times D2)$ become larger than the values to be satisfied by $V1/(S1 \times D1)$ respectively.

With the satisfaction of the expression 7, the battery assembly of the present invention has a large difference in thermal resistance before and after opening and shows a high opening temperature, and the value of $V1/(S1 \times D2)$ is preferably 0.45 or more, and more preferably 0.50 or more, from the standpoint of the achievement of the lower thermal resistance before opening, and is preferably 0.95 or less, and more preferably 0.90 or less, from the standpoint of the achievement of the more stable high opening temperature.

Due to the same mechanism, D2 preferably satisfies the following expression 8. The value of D2 is more preferably 0.40 mm or more, and further preferably 0.70 mm or more, from the standpoint of the suppression of thermal conduction from the single cell causing abnormal heat generation to the adjacent single cell, and is more preferably 4.0 mm or less, further preferably 3.0 mm or less, still further preferably 2.0 mm or less, still further preferably 1.2 mm or less, particularly preferably 1.0 mm or less, and particularly further preferably 0.80 mm or less, from the standpoint of the decrease of the overall thickness of the battery assembly and the sufficient decrease of the thermal resistance before opening.

$$0.10 \text{ mm} \leq D2 \leq 5.0 \text{ mm} \quad \text{expression 8:}$$

The area (S1) of the internal space of the external package and the area (S2) of the thermal insulating material satisfy the following expression 2.

$$0.35 \leq S2/S1 \quad \text{expression 2:}$$

The battery assembly of the present invention preferably has S1, S2, and V1 that satisfy the expressions 3 to 5 respectively, as similar to the partition member of the present invention.

Figure 2A:
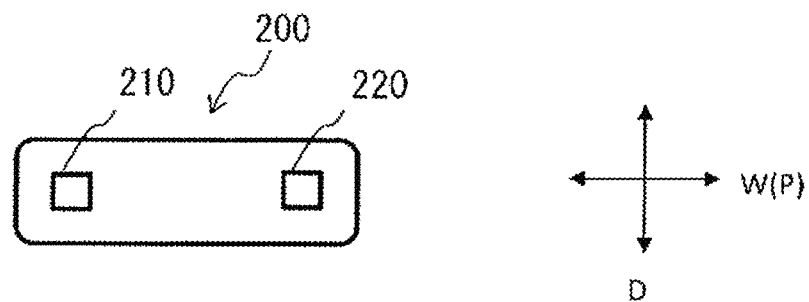
FIG. 2A is a plane view showing one example of a single cell constituting the battery assembly.
Figure 2B:
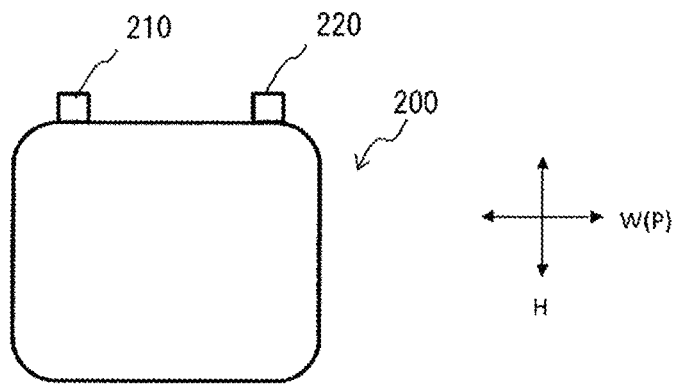
FIG. 2B is a front view showing one example of a single cell constituting the battery assembly.
Figure 2C:
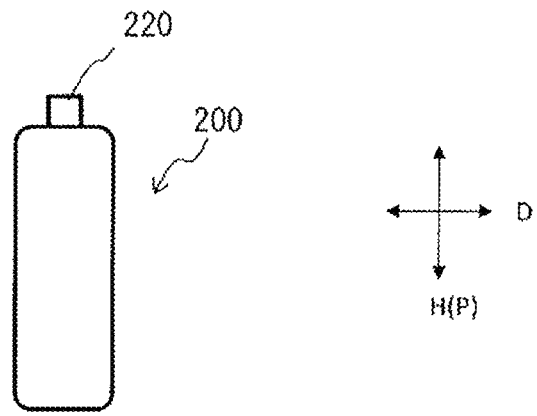
FIG. 2C is a side view showing one example of a single cell constituting the battery assembly.

FIG. 2A is a plane view showing one example of a single cell constituting the battery assembly, FIG. 2B is a front view showing one example of the single cell, and FIG. 2C is a side view showing one example of the single cell.

The single cell 200 has a rectangular parallelepiped shape having a longitudinal (thickness), a lateral (width), and a height, and a terminal 210 and a terminal 220 are provided on the upper surface thereof. The single cell 200 may be, for example, a lithium ion secondary cell equipped with a positive electrode and a negative electrode capable of occluding and releasing lithium ion, and an electrolyte. In addition to a lithium ion secondary cell, other secondary cells, such as a lithium ion all-solid-state cell, a nickel hydrogen cell, a nickel cadmium cell, and a lead cell, may be applied.

Figure 3:
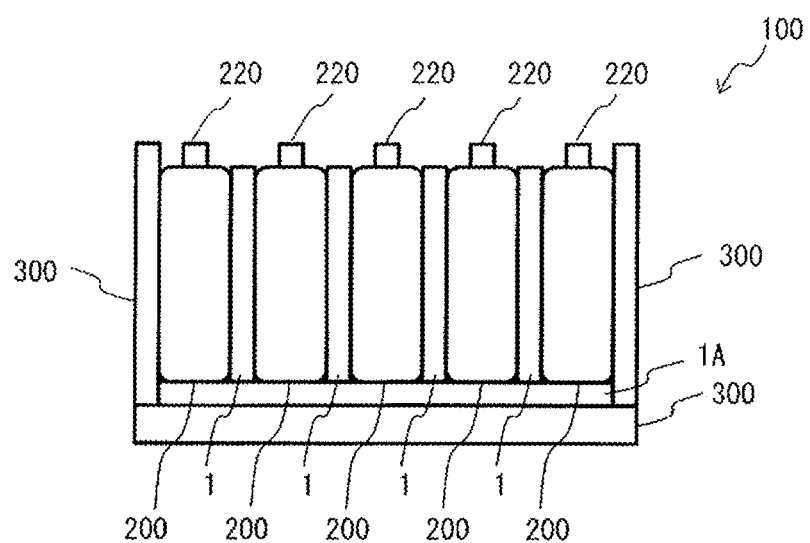
FIG. 3 is an illustration showing an end surface of the battery assembly formed with plural single cells cut at a plane in the height direction passing through the terminals of the single cells.

FIG. 3 is an illustration showing the end surface of the battery assembly formed with plural single cells cut at the plane in the height direction H passing through the terminals of the single cells. The battery assembly 100 includes a chassis 300 having a bottom panel and four side panels, in which plural single cells 200 are housed. The partition members 1 are disposed between the single cells 200, and the single cells 200 adjacent to each other are partitioned in the thickness direction D of the partition member 1. The positive electrode terminal (for example, the terminal 210) and the negative electrode terminal (for example, the terminal 220) of the single cells 200 adjacent to each other are electrically connected in series with bus bars (which are not shown in the figure), and thereby the battery assembly 100 outputs the prescribed electric power. As shown in FIG. 3, the battery assembly 100 may have such a structure that a partition member 1A having the same structure as the partition member 1 is disposed between the bottom panel of the chassis 300 and the single cells 200.

The battery assembly of the present invention may be applied to battery packs mounted, for example, on electric vehicles (EV), hybrid electric vehicles (HEV), plug-in hybrid electric vehicles (PHEV), electric heavy machines, electric motorcycles, electric power-assisted bicycles, vessels, aircrafts, electric railcars, uninterruptible power supplies (UPS), home electricity storage systems, and storage battery systems for stabilizing electric power systems using renewable energy sources, such as wind power, solar power, tidal power, and geothermal power. The battery assembly can also be applied to an electric power source for supplying electric power to other equipments than the aforementioned EV and the like.

EXAMPLES

Specific embodiments of the present invention will be described in more detail with reference to examples below, but the present invention is not limited to the examples.

Example 1

[Production of Partition Member]

As the external package, two sheets of an aluminum laminated film having a length of 150 mm and a width of 95 mm (including nylon (outside) and polypropylene (inside) as resin layers, thickness: 0.12 mm) were superimposed, and three edges were heat-fusion bonded (temperature: 160° C., 2 seconds) in a width of 5 mm. A porous sheet (calcium silicate paper containing calcium silicate, thickness: 0.9 mm, density: 0.5 g/cm$^3$) cut to a rectangular shape having a length of 100 mm and a width of 50 mm as the thermal insulating material was housed in the external package via the part that was not fusion bonded, and after charging 3.4 g (cm$^3$) of water thereto, the external package was vacuum sealed by heat-fusion bonding the part that was not fusion bonded in a width of 5 mm, so as to produce a partition member having a length of 150 mm, a width of 95 mm, and a thickness of 1.1 mm.

The thickness D1 of the thermal insulating material was obtained by measuring the thickness of the thermal insulating material before vacuum sealing, or by subtracting the thickness of the external package from the thickness of the portion where the thermal insulating material and the external package were laminated in the vacuum sealed partition member. In the measurement of the thickness, the pressure applied to the thermal insulating material was regulated to less than 0.1 MPa.

The volume V1 of the liquid in the partition member was obtained by measuring the weight of water injected before vacuum sealing, or by measuring the weight change occurring after drying the liquid by opening holes in the sealed portion of the external package of the vacuum sealed partition member.

It was confirmed that in the portion of the partition member sealed with the external package, the thickness of the region having no thermal insulating material was smaller than the thickness of the portion where the thermal insulating material and the external package were laminated, and thereby the internal pressure of the external package was confirmed to be lower than the external pressure.

[Measurement of Change in Thermal Resistance]

On a heater, a mica sheet (length: 150 mm, width: 100 mm, thickness: 0.5 mm), a brass plate 1 (length: 150 mm, width: 100 mm, thickness: 5 mm), the partition member, a brass plate 2 (length: 150 mm, width: 100 mm, thickness: 5 mm), and a thermal insulating plate (formed of glass fibers, length: 150 mm, width: 100 mm, thickness: 10 mm) were laminated in this order, and applied with a load from above regulated to 2 t with a hydraulic pressing machine.

The thickness D2 of the thermal insulating material was obtained in such a manner that after applying the load with the hydraulic pressing machine, the external package was once taken out from the hydraulic pressing machine, and the thickness of the external package was subtracted from the thickness of the portion where the thermal insulating material and the external package were laminated in the partition member. In the measurement of the thickness, the pressure applied to the thermal insulating material was regulated to less than 0.1 MPa.

The heater was heated from room temperature to 200° C. at a rate of 5° C./min, and the temperature changes of the brass plates 1 and 2 were measured. The thermal resistance R2 (m$^2$·K/W) of the partition member was obtained from the measurement data according to the following expression.

$$R2=(t1-t2)/[\{(th-t1)/R1\}-(C/S)\times\Delta t1]$$

R1: thermal resistance of mica sheet, 0.0032 (m$^2$·K/W)
th: temperature of heater (K)
t1: temperature of brass plate 1 (K)
$\Delta t1$: temperature change by time of brass plate 1 (K/s)
t2: temperature of brass plate 2 (K)
C: heat capacity of brass plates 1 and 2 (J/K)
S: area of brass plates 1 and 2 (m$^2$)

The temperature of the brass plate 1, at which the fusion bonded part is opened, and water vapor was discharged, was recorded as the opening temperature, and the values of the thermal resistance of the partition member before and after opening were obtained. The opening temperature was 165° C., which was sufficiently high for the stable operation as a partition member, and the thermal resistances before and after opening were $3.5 \times 10^{-3}$ and $5.2 \times 10^{-3}$ (m²·K/W) respectively, resulting in a high opening temperature, a low thermal resistance before opening, and a high thermal resistance after opening. Accordingly, good thermal resistance switching characteristics (i.e., characteristics of switching the thermal resistance before and after opening the partition member) were exhibited.

Examples 2 to 5 and Comparative Examples 1 to 3

The partition members were produced in the same manner as in Example 1 except that the size (length and width) of the thermal insulating material and the amount of water were changed as shown in Table 1, and the opening temperature and the thermal resistances before and after opening were measured.

The size (length, width, and thickness) of the thermal insulating material, the amount of the liquid, and the size (length and width) of the region of the internal space of the external package in Examples and Comparative Examples are shown in Table 1. The thickness of the thermal insulating material after the measurement, the opening temperature, and the values of the thermal resistance before and after opening in Examples and Comparative Examples are also shown. For the results of the opening temperature and the thermal resistance, the case with a good result is shown with "A", and the case with a poor result is shown with "B".

In Comparative Example 1, the liquid volume V1 was excessively larger than the internal space volume (internal space area×thermal insulating material thickness), and therefore the opening temperature was decreased to fail to achieve the stable operation as the partition member.

In Comparative Example 2, the liquid volume V1 was excessively smaller than the internal space volume (internal space area×thermal insulating material thickness), and therefore the value of the thermal resistance before opening was large.

In Comparative Example 3, the deformation amount of the thermal insulating material was large due to the small value of S2/S1, and as a result, the thermal resistance after opening was small.

On the other hand, as shown in Table 1, in the case where the partition member satisfied the expression 1 as in Examples 1 to 5, the opening temperature was high, the thermal resistance before opening was low, and the thermal resistance after opening was high. Accordingly, good thermal resistance switching characteristics (i.e., characteristics of switching the thermal resistance before and after opening the partition member) were obtained. Similarly, in the case where the battery assembly satisfied the expression 5, good thermal resistance switching characteristics were obtained.

REFERENCE SIGN LIST

1: partition member
100: battery assembly

TABLE 1

| | Production condition of partition member | | | | | | | | | |
|---|---|---|---|---|---|---|---|---|---|---|
| | Internal space | | | Thermal insulating material | | | | | | |
| | Length (mm) | Width (mm) | Area S1 (cm²) | Length (mm) | Width (mm) | Area S2 (cm²) | Thickness D1 (mm) | Amount of liquid V1 (cm³) | V1/(S1 × D1) | S2/S1 |
| Example 1 | 140 | 85 | 119 | 100 | 50 | 50 | 0.9 | 3.4 | 0.32 | 0.42 |
| Example 2 | 140 | 85 | 119 | 118 | 61 | 71.98 | 0.9 | 5.0 | 0.47 | 0.60 |
| Example 3 | 140 | 85 | 119 | 120 | 70 | 84 | 0.9 | 5.6 | 0.52 | 0.71 |
| Example 4 | 140 | 85 | 119 | 125 | 75 | 93.75 | 0.9 | 6.4 | 0.60 | 0.79 |
| Example 5 | 140 | 85 | 119 | 135 | 80 | 108 | 0.9 | 5.5 | 0.51 | 0.91 |
| Comparative Example 1 | 140 | 85 | 119 | 118 | 61 | 71.98 | 0.9 | 8.0 | 0.75 | 0.60 |
| Comparative Example 2 | 140 | 85 | 119 | 118 | 61 | 71.98 | 0.9 | 2.0 | 0.19 | 0.60 |
| Comparative Example 3 | 140 | 85 | 119 | 80 | 40 | 32 | 0.9 | 2.2 | — | 0.27 |

| | Measurement result of thermal resistance | | | | | | | | |
|---|---|---|---|---|---|---|---|---|---|
| | Load (t) | Thickness D2 (mm) | V1/(S1 × D2) | Opening temperature (°C.) | | Thermal resistance before opening (m²·K/M) | | Thermal resistance after opening (m²·K/w) | |
| Example 1 | 2 | 0.45 | 0.63 | 165 | A | 0.0035 | A | 0.0052 | A |
| Example 2 | 2 | 0.54 | 0.78 | 154 | A | 0.0032 | A | 0.0062 | A |
| Example 3 | 2 | 0.54 | 0.87 | 157 | A | 0.0033 | A | 0.0060 | A |
| Example 4 | 2 | 0.62 | 0.87 | 130 | A | 0.0032 | A | 0.0067 | A |
| Example 5 | 2 | 0.57 | 0.81 | 130 | A | 0.0027 | A | 0.0061 | A |
| Comparative Example 1 | 2 | 0.57 | 1.18 | 113 | B | 0.0029 | A | 0.0063 | A |
| Comparative Example 2 | 2 | 0.47 | 0.36 | 165 | A | 0.0040 | B | 0.0056 | A |
| Comparative Example 3 | 2 | 0.38 | — | 165 | A | 0.0044 | B | 0.0040 | B |

110: thermal insulating material
120: external package
120a: peripheral portion
120b: gap
200: single cell
300: chassis

The invention claimed is:

1. A partition member, comprising:
a liquid;
a thermal insulating material capable of retaining the liquid; and
an external package housing the thermal insulating material and the liquid,
wherein the partition member has a thickness direction and a plane direction perpendicular to the thickness direction, and satisfies expression 1 and expression 2:

$$0.25 \leq V1/(S1 \times D1) \leq 0.70 \qquad \text{expression 1:}$$

$$0.35 \leq S2/S1 \qquad \text{expression 2:}$$

wherein:
S1 is an area of an internal space of the external package in a plane perpendicular to the thickness direction;
S2 is an area of the thermal insulating material in the plane perpendicular to the thickness direction;
D1 is a thickness of the thermal insulating material in the thickness direction; and
V1 is a volume of the liquid, and
wherein the partition member partitions single cells, or a single cell and a member other than a single cell, in the thickness direction.

2. The partition member according to claim 1, wherein S1 satisfies the relationship of the following expression 3:

$$10 \text{ cm}^2 \leq S1 \leq 2{,}000 \text{ cm}^2. \qquad \text{expression 3:}$$

3. The partition member according to claim 1, wherein S2 satisfies the relationship of the following expression 4:

$$10 \text{ cm}^2 \leq S2 \leq 2{,}000 \text{ cm}^2. \qquad \text{expression 4:}$$

4. The partition member according to claim 1, wherein V1 satisfies the relationship of the following expression 5:

$$0.02 \text{ cm}^3 \leq V1 \leq 1{,}000 \text{ cm}^3. \qquad \text{expression 5:}$$

5. The partition member according to claim 1, wherein D1 satisfies the relationship of the following expression 6:

$$0.10 \text{ mm} \leq D1 \leq 5.0 \text{ mm}. \qquad \text{expression 6:}$$

6. The partition member according to claim 1, wherein the external package is a laminate of a metal foil and a resin.

7. The partition member according to claim 1, wherein the partition member has a heat-fusion bonded peripheral portion.

8. The partition member according to claim 7, wherein the remaining thermal insulating material after opening of the heat-fusion bonded peripheral portion exhibits a higher thermal resistance than before the heat-fusion bonded peripheral portion is opened.

9. A battery assembly, comprising:
a partition member, comprising:
a liquid;
a thermal insulating material capable of retaining the liquid; and
an external package housing the thermal insulating material and the liquid,
wherein the partition member has a thickness direction and a plane direction perpendicular to the thickness direction, and satisfies expression 7 and expression 2:

$$0.25 \leq V1/(S1 \times D1) \leq 0.70 \qquad \text{expression 1:}$$

$$0.35 \leq S2/S1 \qquad \text{expression 2:}$$

wherein:
S1 is an area of an internal space of the external package in a plane perpendicular to the thickness direction;
S2 is an area of the thermal insulating material in the plane perpendicular to the thickness direction;
D2 is a thickness of the thermal insulating material in the thickness direction; and
V1 is a volume of the liquid, and
wherein the partition member partitions single cells, or a single cell and a member other than a single cell, in the thickness direction, and plural single cells.

10. The battery assembly according to claim 9, wherein S1 satisfies the relationship of the following expression 3:

$$10 \text{ cm}^2 \leq S1 \leq 2{,}000 \text{ cm}^2. \qquad \text{expression 3:}$$

11. The battery assembly according to claim 9, wherein S2 satisfies the relationship of the following expression 4:

$$10 \text{ cm}^2 \leq S2 \leq 2{,}000 \text{ cm}^2. \qquad \text{expression 4:}$$

12. The battery assembly according to claim 9, wherein V1 satisfies the relationship of the following expression 5:

$$0.02 \text{ cm}^3 \leq V1 \leq 1{,}000 \text{ cm}^3. \qquad \text{expression 5:}$$

13. The battery assembly according to claim 9, wherein D2 satisfies the relationship of the following expression 8:

$$0.10 \text{ mm} \leq D2 \leq 5.0 \text{ mm}. \qquad \text{expression 8:}$$

14. The battery assembly according to claim 9, wherein the external package is a laminate of a metal foil and a resin.

15. The battery assembly according to claim 9, wherein the battery assembly comprises a liquid having a boiling point under ordinary pressure of 80 to 250° C. as the liquid.

16. A partition member, comprising:
a liquid;
a thermal insulating material capable of retaining the liquid, and
an external package housing the thermal insulating material and the liquid,
wherein the partition member has a thickness direction and a plane direction perpendicular to the thickness direction, and satisfies expression 7 and the following expression 2:

$$0.40 \leq V1/(S1 \times D2) \leq 1.00 \qquad \text{expression 7:}$$

$$0.35 \leq S2/S1 \qquad \text{expression 2:}$$

wherein:
S1 is an area of an internal space of the external package in a plane perpendicular to the thickness direction;
S2 is an area of the thermal insulating material in the plane perpendicular to the thickness direction;
D2 is a thickness of the thermal insulating material in the thickness direction;
and
V1 is a volume of the liquid, and
wherein the partition member partitions single cells, or a single cell and a member other than a single cell, in the thickness direction, in structuring a battery assembly comprising the partition member and plural single cells.

17. The partition member according to claim 16, wherein S1 satisfies the relationship of the following expression 3:

$$10 \text{ cm}^2 \leq S1 \leq 2{,}000 \text{ cm}^2. \quad \text{expression 3:}$$

18. The partition member according to claim 16, wherein S2 satisfies the relationship of the following expression 4:

$$10 \text{ cm}^2 \leq S2 \leq 2{,}000 \text{ cm}^2. \quad \text{expression 4:}$$

19. The partition member according to claim 16, wherein V1 satisfies the relationship of the following expression 5:

$$0.02 \text{ cm}^3 \leq V1 \leq 1{,}000 \text{ cm}^3. \quad \text{expression 5:}$$

20. The partition member according to claim 16, wherein D2 satisfies the relationship of the following expression 8:

$$0.10 \text{ mm} \leq D2 \leq 5.0 \text{ mm}. \quad \text{expression 8:}$$

\* \* \* \* \*